(12) United States Patent
Deuber et al.

(10) Patent No.: US 8,203,433 B2
(45) Date of Patent: Jun. 19, 2012

(54) METHOD FOR COMMISSIONING AN RFID NETWORK

(75) Inventors: Patrick Deuber, Siebnen (CH); Roland Kueng, Wolfhausen (CH)

(73) Assignee: Intermec IP Corp., Everett, WA (US)

( * ) Notice: Subject to any disclaimer, the term of this patent is extended or adjusted under 35 U.S.C. 154(b) by 751 days.

(21) Appl. No.: 12/227,006

(22) PCT Filed: Sep. 22, 2006

(86) PCT No.: PCT/CH2006/000515
§ 371 (c)(1),
(2), (4) Date: Mar. 30, 2009

(87) PCT Pub. No.: WO2007/128141
PCT Pub. Date: Nov. 15, 2007

(65) Prior Publication Data
US 2009/0303016 A1 Dec. 10, 2009

(30) Foreign Application Priority Data

May 4, 2006 (CH) .......................... 725/06

(51) Int. Cl.
*G08B 21/00* (2006.01)
(52) U.S. Cl. .............. 340/10.3; 340/10.1; 340/10.32; 340/572.4; 370/437; 370/458; 375/138
(58) Field of Classification Search .............. 370/437, 370/458; 375/138; 340/572, 10
See application file for complete search history.

(56) References Cited

U.S. PATENT DOCUMENTS
2005/0088284 A1 4/2005 Zai et al.
(Continued)

FOREIGN PATENT DOCUMENTS
EP 1628238 A1 2/2006
(Continued)

OTHER PUBLICATIONS

PCT Initial Publication with International Search Report, WO2007/128141, Nov. 15, 2007, 48 pages.
(Continued)

*Primary Examiner* — Jennifer Mehmood
*Assistant Examiner* — Mark Rushing
(74) *Attorney, Agent, or Firm* — Perkins Coie LLP

(57) ABSTRACT

The invention relates to a method for implementing an RFID network, comprising the following steps: each read-write station transmits at least one test signal; each read-write station (1, 2, 3, 11, N0-N17) receives the (receivable) test signals of neighboring read-write stations (1, 2, 3, 11, N0-N17), said signals comprising a station address, a frequency channel number and a measured signal intensity of each receivable neighboring read-write station (1, 2, 3, 11, N0-N17); a network structure (110) comprising structure data and a co-ordination plan comprising co-ordination data are calculated using a number of time slots (21, 31, 41) and a number of frequency channels (20, 30, 40), a service frequency channel (reader service channel, RSK) and/or a service time slot (reader service time, RST) being defined and used by the read-write stations (1, 2, 3, 11, N0-N17) for service purposes; and at least corresponding structure data and co-ordination data for an organized, synchronous network operation is transmitted to the read-write stations (1, 2, 3, 11, N0-N17) so that said stations (1, 2, 3, 11, N0-N17) do not interfere with one another.

20 Claims, 6 Drawing Sheets

U.S. PATENT DOCUMENTS

| | | | |
|---|---|---|---|
| 2006/0022800 A1* | 2/2006 | Krishna et al. | 340/10.2 |
| 2006/0022801 A1* | 2/2006 | Husak et al. | 340/10.5 |
| 2006/0076401 A1* | 4/2006 | Frerking | 235/380 |
| 2007/0001813 A1* | 1/2007 | Maguire et al. | 340/10.2 |
| 2008/0224869 A1* | 9/2008 | Kaplan | 340/572.1 |
| 2009/0309750 A1 | 12/2009 | Deuber et al. | |

FOREIGN PATENT DOCUMENTS

| | | |
|---|---|---|
| EP | 1638036 A1 | 3/2006 |
| WO | 0036553 A1 | 6/2000 |
| WO | 2006015349 A2 | 2/2006 |
| WO | 2006037239 A1 | 4/2006 |

OTHER PUBLICATIONS

PCT Written Opinion, PCT/CH2006/000515, Dec. 4, 2008, 5 pages.
PCT Initial Publication with International Search Report, WO2007/128142, Nov. 15, 2007, 50 pages.
PCT Written Opinion, PCT/CH2006/000516, Dec. 4, 2008, 4 pages.
Unknown, European Telecommunications Standards Institute. "Electromagnetic Compatibility and Radio Spectrum Matters (ERM)." ETSI TR 102 436 V1.1.1. Sophia Antipolis, France. Dec. 2005, 29 pages.

* cited by examiner

METHOD FOR COMMISSIONING AN RFID NETWORK

The present invention relates to the field of automatic identification (radio identification) and localization of objects; it relates to a method for commissioning a radio frequency identification network (RFID network), comprising a number of read/write stations, in which a reader service signal is modulated on a read/write signal which is required for processing a number of electronic tags.

PRIOR ART

Depending on the country, a plurality of frequency channels are available for RFID applications. In applications with a small number of read/write stations, it is sufficient for these stations to operate on different frequency channels, in order to prevent mutual interference. In systems with a greater number of read/write stations, the number of frequency channels will no longer be sufficient, and the read/write stations must therefore share the channels and the time axis. As a result of the high transmission power (around 1 watt) which a read/write station emits in order to be able to supply power to the electronic tags to be read, the range of the read/write stations is very long with respect to their sensitive receivers (hundreds of meters). In this case, mutual interference between the request processes usually occurs when, for example, just two stations are transmitting at the same time in the same frequency channel.

According to the prior art, this can be prevented by a synchronization line between the read/write stations and by providing a fixed allocation of the resources; this is disclosed, for example, with the trigger bus in WO 0036553. The laying of such additional lines is not very attractive in relatively large areas. EP 1628238 discloses a method for synchronization of a plurality of read/write stations which are all operating on a single frequency channel, in which synchronization patterns are inserted periodically by some of the read/write stations at a time between the read/write processes, and the other read/write stations are aligned with these patterns. This method is not very suitable when a plurality of frequency channels are being (must be) used, and a method based on so-called frequency hopping or frequency agility is used, particularly when there are more read/write stations than frequency channels or time slots. Furthermore, this does not solve the problem of how a relatively large RFID network can be operated efficiently and reliably; synchronization on its own is not sufficient in this case.

WO 2006/037239 admittedly describes a communication means which read/write stations can use to interchange information with one another but, in this case as well, the questions relating to the commissioning of a plurality of read/write stations in a network still remain open. A so-called reader service signal is disclosed as communication means (referred to for short in the following text as an RS signal), by means of which direct communication can be carried out without any time loss for read/write processes, on the physical air interface.

According to EP 1638036, specifically designed read/write stations exist which can measure the utilization of frequency channels in an additional evaluation/control unit, on the basis of which the transmission channels and the transmission power are then allocated to the read/write stations and are assigned to the read/write stations via a wire link (data bus). This measurement function is prior art in the field of radio and is generally carried out on the basis of analysis of the reception signal strength (RSSI). The described method can be used only when a small number of read/write stations are being operated, such that each read/write station can be assigned at least one frequency channel. The method can react only poorly, if at all, to dynamic changes. Furthermore and in addition, a wire-based data bus is required, whose time response is unknown and which therefore does not directly allow synchronous operation of a plurality of read/write stations on one frequency or using the frequency hopping method.

US2005/0088284 discloses the operation of read/write stations with a wire-based data bus (backbone). Each read/write station contains a table of interfering neighbors and reserves a time slot for a read/write process by transmission of a so-called tag operation (TO) data packet and an end tag operation (ETO) data packet on this bus. Furthermore, it is possible to allow individual read/write stations to also read tags which are supplied with power with the aid of an adjacent read/write station. The identification of the read/write stations in a network makes it possible for the read/write stations that are involved to interchange the received tag information with one another. Before a read/write station starts to transmit, it checks whether any other read/write station wishes to operate in the request mode (listen before talk (LBT) on the data bus (backbone)). The request time slot is reserved by the active read/write station by means of a TO and ETO packet on the backbone network (slot reservation). The disadvantage of this network is the wiring that is required between the read/write stations and the use of a server. A read/write station cannot directly set up a link with read/write stations that are to be newly added. Reconfiguration is required on each occasion. One disadvantage is that the interference situation is not assessed on the basis of the actual instantaneous interference on the RF channel, thus resulting in conservative use in relatively large networks. Furthermore, collisions can occur on the data bus, which must be resolved, thus wasting time.

According to WO 2006/015349, the read/write station network operates with a central unit, the so-called mid-level processor, which is connected to a server via a cable link. The read/write stations can receive and assess the read/write signals from other read/write stations. The data gathered about possible interference is preprocessed in the mid-level processor to form a set of operating parameters, which makes it possible to set up and to operate a network. The method is very complex. The read/write stations are linked to one another via a wire-based backbone, and direct communication is possible between the read/write stations. The so-called mid-level processor which centrally controls the network operation is likewise connected to the backbone. The transmitting and receiving part of a read/write station can operate independently in a known manner and allow a read/write station to monitor a request which has been produced by another read/write station. In this operating mode, which is referred to as interreader signal transmission, the expression "Interreader" relates to the involvement of two read/write stations in a single read process, and not to the communication between the read/write stations.

Although the monitoring read/write station can be aware of the information in the data which is sent from the other read/write station to the tag, and is aware of the tag response, no explicit data interchange is, however, implemented for operation of a network. Inconspicuous identification of the read/write station must first of all be determined with the aid of the data obtained in the mid-level processor, and must be transmitted via the backbone. In any case, the system can in this way also carry out an interference analysis and can send the data obtained about the other read/write stations to the mid-level processor in order to set up interference-free operation and again to instruct the read/write stations.

DESCRIPTION OF THE INVENTION

The object of the present invention is therefore to develop a method for commissioning an RFID network such that a number of read/write stations can be connected to form undisturbed, synchronous network operation free of wire-based communication, on the physical air interface, making use of the available frequency channels and time slots which are as short as possible.

The object on which the invention is based relating to the method for commissioning an RFID network is achieved by the features of independent claim 1. Alternative refinements of the invention are the subject matter of dependent claims 2 to 9.

The essence of the invention is that the read/write stations which can potentially be included in an RFID network use their own transmitted test signal and reception of all the test signals from receivable adjacent read/write stations to generate neighborhood tables which, for a collecting station for these neighborhood tables, offer the basis for commissioning a network utilizing the available resources "number of frequency channels" and available time slots.

In this case, the method advantageously uses the reader service signal (RS signal) as disclosed in application WO 2006/037239, as a communication means directly on the physical air interface between the read/write stations. The test signal is contained as a first sequence on the reader service signal and comprises at least one own station address on which the test signal is transmitted. The received test signals of adjacent read/write stations lead to the creation of a neighborhood table with the information and/or characteristic variables relating to the station addresses, the frequency channel numbers and the signal strength of receivable read/write stations. A collecting station for all the neighborhood tables uses these as the basis to calculate a network structure with structure data, and to calculate a coordination plan with coordinate data. This also includes the definition of a service frequency channel (reader service channel, RSK) and of a service time slot (reader service time, RST) which are used for servicing purposes and/or synchronization purposes by the read/write stations. The collecting station sends appropriate structure data and coordination data for organized, synchronous network operation to all the read/write stations, so that they do not have a disturbing influence on one another.

During commissioning, one read/write station is advantageously entrusted with a task of a master, which is referred to as a parent, and preferably accesses most adjacent read/write stations via the physical air interface; those read/write stations which communicate directly with the parent in the form of a star are referred to as children of this parent and maintain at least one defined radio link therewith.

According to the invention, the children change to the service frequency channel for the duration of the service time slot, for the purpose of synchronization with the parent, which they receive by means of a second sequence on the reader service signal. An alternative refinement of the invention provides that the children receive a sequence on the reader service signal for the purpose of synchronization with the parent, but for this purpose remain on their operating frequency channel during the service time slot, and the parent sends all the available frequency channels with the second sequence. A further embodiment provides for the children to change from an operating frequency channel to the service frequency channel directly after a read/write process, in order to receive the sequence from the parent. The first sequence and the second sequence on the reader service signal may, of course, be the same or different to one another.

Children which cannot be received sufficiently well by the parent are advantageously managed by a child acting as an assistant to the parent, with appropriate structure data and coordination data. In order to adapt the structure data and/or the coordination data, a parent or assistant advantageously sends a message to its child, in response to which the child can transmit a response message.

A further advantageous refinement of the invention provides that the collecting station is a reader service terminal and/or a selected read/write station which at least temporarily carries out the commissioning of the RFID network.

Furthermore, all the read/write stations in an RFID network may have a common data line (WLAN, Ethernet, CAN-bus, . . . ) and may be connected to a server (middleware server, applications server) or to a read/write station which is acting as a master, for the purpose of data transmission of the read/write processes.

BRIEF DESCRIPTION OF THE DRAWING

The invention will be explained in an exemplary form in the following text with reference to the figures. Identical items are in principle identified by the same reference symbols in the figures. In the figures, purely schematically.

APPROACHES TO IMPLEMENTATION OF THE INVENTION

Figure 1:
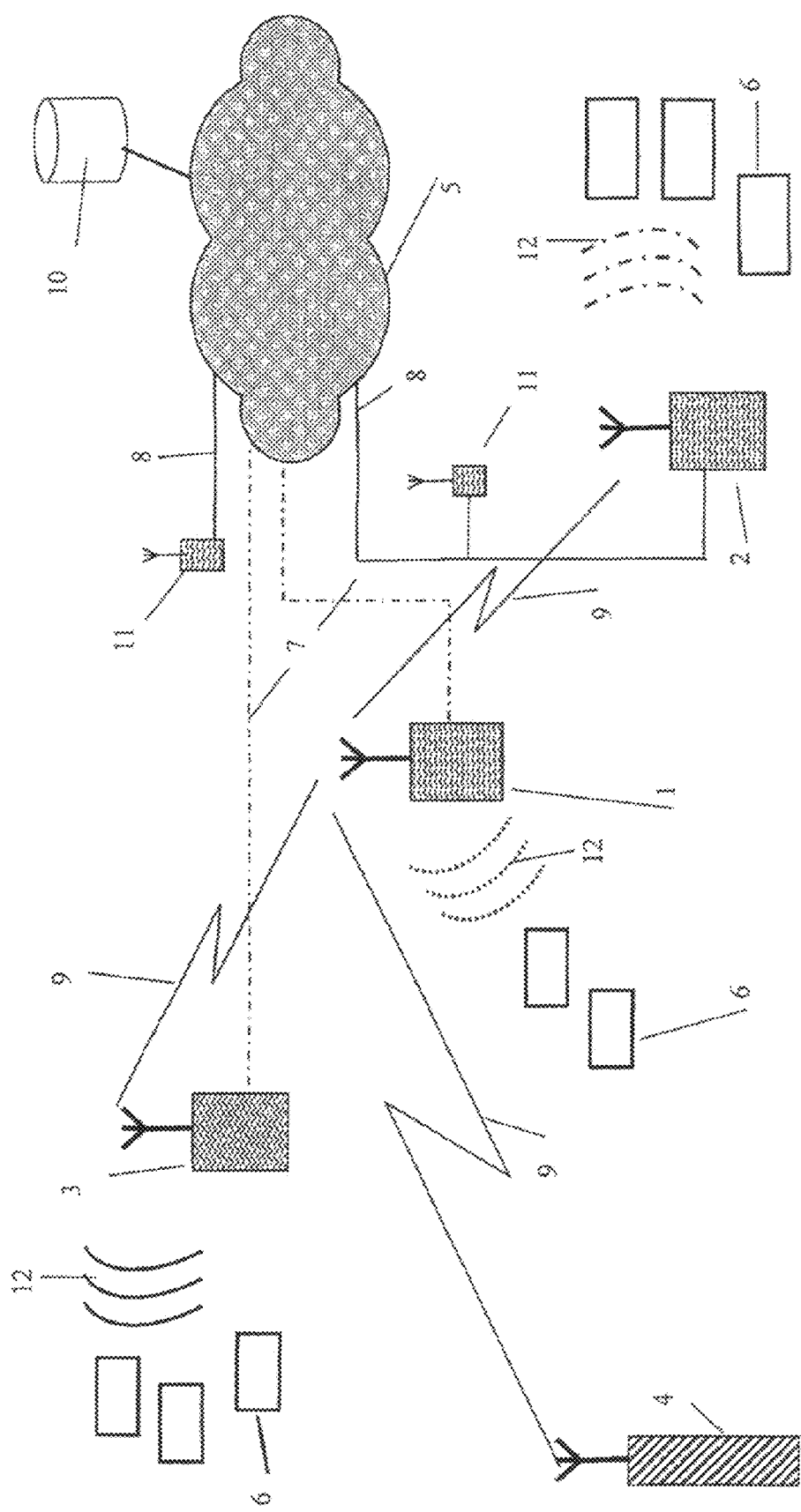
FIG. 1 shows a detail of an RFID network, comprising a number of tags and a number of read/write stations.

In FIG. 1, 1, 2, 3, 11 denote a number of RFID read/write stations which communicate with one another via the physical air interface by means of a reader service signal 9 (the Reader Service Signal 9 for the read/write stations 11 is not shown, for the sake of clarity). The read/write stations 1 and 3 are connected via a WLAN link 7 to an Intranet 5, and the read/write stations 2, 11 have a cable link 8 to the Intranet 5. All the read/write stations 1, 2, 3, 11 have access to the server 10 via the Intranet 5. The read/write stations 1, 2, 3, 11 maintain an operative link 12 to electronic tags 6, by means of a radio link, in order to carry out read/write processes. A reader service terminal 4 (RS terminal 4) is linked to the read/write stations 1, 2, 3, 11 via the physical air interface in order to set up an RFID network.

Figure 2:
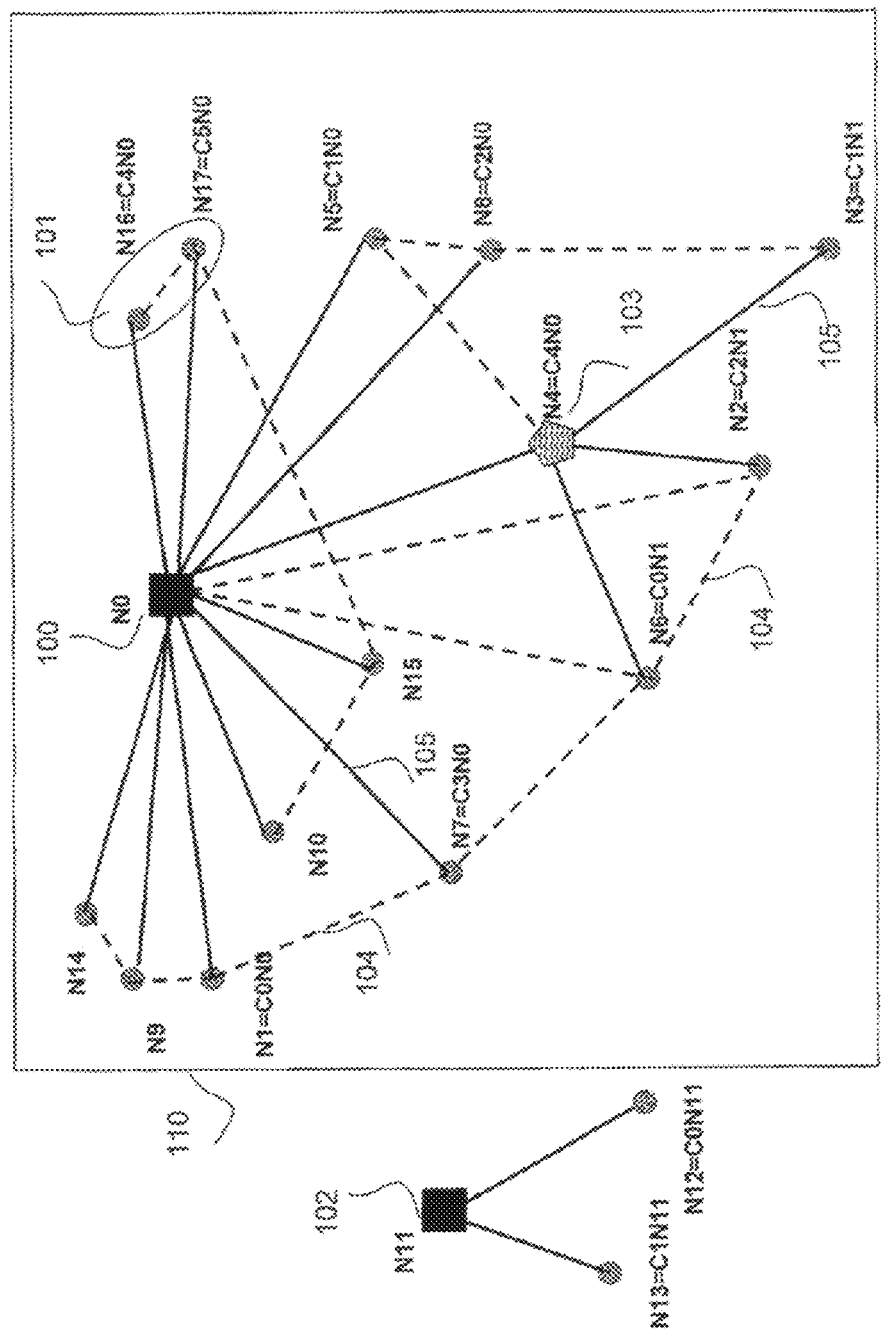
FIG. 2 shows a further, more complex example of an RFID network topology.

FIG. 2 shows one example of a topology as illustrated for 18 nodes—the read/write stations N0 to N17. In this network, one read/write station N0 has been defined as the master 100 during the setting-up process, since this read/write station N0 directly accesses the greatest number of adjacent read/write stations, the nodes N1, N4, N5, N7, N8, N9, N10, N14, N15, N16, N17, via the physical air interface. At the same time, the read/write station N0 is the parent of 11 nodes, the so-called children CxNO, where x equals 1 to 11, with the node N4, or the read/write station N4, also being an assistant 103 to the master 100. The read/write station N4 supplies the nodes or children N2, N3 and N6 which were not able to receive the node N0 with sufficient strength during the neighborhood search (lack of direct link 105 or excessively weak link 105 of the Reader Service Signal). The nodes or the read/write stations N11, N12 and N13 are isolated from the network (no dashed links 104 and no direct link 105 of the Reader Service Signal) and therefore form an autonomous network with masters 102 (for example separate rooms, different floors . . . ) to which the same resources in terms of time slots and frequency channels are open, as the network with the master 100. The read/write stations N16 and N17 form a cooperative group 101, and they therefore use the same frequency at the same time.

The invention uses RFID read/write stations which can read or write passive or semi-active tags over a relatively long distance, in that they supply power to the tags from a read carrier signal and an RF frequency which is required to send back data from the tags to the read/write stations. In large RFID installations, in particular when using RF frequencies in the UHK or SHF range, the readers/writers themselves have a very long range of up to several hundred meters. With an output power of +36 dBm and a required sensitivity for tag response signals of −84 dBm, this results in a dynamic range of 120 dB. Read/write stations separated by more than 100 m therefore still considerably interfere with the read process of other read/write stations, even if there is no visual link. The present invention is concerned with minimizing this mutual interference and with allowing a maximum number of read/write stations to operate in parallel in accordance with a schedule; to do this, it is necessary for it to be possible to start up a complex system such as this in an organized manner.

All the read/write stations themselves are designed on the basis of the known principle of "Software Defined Radio" (SDR), thus giving them a high degree of flexibility during operation. For example, different modulations can easily be produced and varied by means of software. Frequencies are changed in less than one millisecond, and a plurality of receivers can easily be provided as a multiply instant software routine in baseband. Broadband SDR can even process a plurality of reception channels in parallel without this resulting in greater hardware complexity or relevant additional price.

The following description is subdivided in accordance with the three methods for commissioning (installation mode) an RFID network, for coordination or configuration, and for network operation (operation mode).

A. Method for Commissioning an RFID Network (Installation)

As is illustrated in FIG. 2, the read/write stations N0 to N17 are placed at the point of use and are switched to a setting-up mode (installation mode). All the internal clocks in the read/write stations N0 to N17 are preset to an accuracy of a few seconds. Each read/write station N0 to N17 repeatedly sends a virtual read signal, which contains the reader service signal 105 (RS signal 105) with the read/write station identification (for example AM signal at a fraction of or at the full carrier power and 10% . . . 100% modulation index) from a predetermined time, which corresponds to the time at which the physical placing of all the read/write stations was completed. The read/write stations N0 to N17 create a neighborhood table using the reception signal level measurement of the sideband of the RS signal 105. The RS signal 105 is in each case advantageously activated after a pseudo-random time in each read/write station N0 to N17, in order to avoid repeated collisions. The RS signal 105 is kept short in time and essentially contains only the address of each read/write station N0 to N17 modulated on it for identification purposes, as well as synchronization aids for the other, adjacent receivers of the read/write stations N0 to N17. The receivers of the read/write stations N0 to N17 are always switched on, in order not to miss a transmission from an adjacent read/write station N0 to N17.

After a specific time, the neighborhood tables are created, provided with the addresses and the reception levels of the read/write stations N0 to N17, and the data are gathered with the aid of the RS signal 105. A read/write station (1, 2, 3, 11, N0-N17) and/or a reader service terminal 4 is used as a collecting station.

The resources for each read/write station N0 to N17 in the RFID network are now calculated using a planning algorithm. Resources means the allocation of available time slots 21, 31, 41 in FIGS. 3a, b, FIG. 4 and FIG. 5 and frequency channels 20, 30, 40 in FIGS. 3a, b, FIG. 4 and FIG. 5 for each read/write station N0 to N17, and the creating of a network topology which is used for well-organized, efficient data interchange with the aid of the RS signal 105. The frequency channels 20, 30, 40 are controlled by country-specific requirements (for example ETSI, FCC). The maximum durations of the time slots 21, 31, 41 are likewise restricted by requirements, and the minimum duration is restricted by a read process for an electronic tag (shown only in FIG. 1) based on a specific protocol. Furthermore, each read/write station N0 to N17 can be allocated an urgency factor, corresponding to its role in an identification process. This factor is included in the definition of the schedule for the time/frequency slots, together with the disturbance variable which results from the signal strengths of the neighborhood search. The network topology to be used is preferably a simple star shape, with the read/write station N0 with the most neighbors becoming the master 100. The master 100 maintains active links via the RS signal 105 with its neighbors N1, N4, N5, N7, N8, N9, N10, N14, N15, N16, N17. Links 104 which are not active but cause interference are shown by dashed lines in FIG. 2.

A further suitable topology is a cluster shape. This is particularly appropriate when there are no read/write stations N0 to N17 which can hear all the adjacent read/write stations sufficiently well. Networks such as these operate with parent and child relationships. In consequence, the master 100 communicates via one of its children, specifically the child N4, which therefore becomes the assistant 103, with the remote group N2, N3, N6. In a third case, there is a completely isolated branch element which cannot hear any adjacent read/write stations. This case is trivial, the group comprising the read/write stations N11, N12, N13 can be operated independently of the rest, by means of its own master 102. Other topologies are also included by further subdivision of the concepts on which the invention is based.

The read/write stations N0 to N17 are then switched to a coordination mode, or configuration mode, within which the network information (schedule) is programmed in the read/write stations N0 to N17. This is done alternatively either via a backbone network (in FIG. 1 comprising: line links 8, WLAN links 7, Intranet 5, server 10) or the RS terminal 4 in FIG. 1 or in FIG. 2 with the aid of the master 100 (or master 102) respectively), via the RS signal 9. Finally, the entire network starts the normal operational phase in the operation mode, or network operation, at a defined time:

1) Each read/write station N0 to N17 knows its frequency channel or, in the case of frequency hopping, the start channel and the hopping sequence.

2) Each read/write station N0 to N17 knows the start time and the time duration of its read operation.

3) Each read/write station N0 to N17 knows its role as a master, assistant, parent or child, and the addresses of its direct remote contacts (parent/child-child/parent).

In the operation mode, or in network operation, various adaptations can now be carried out advantageously and reliably to stations and in the network.

One alternative option for commissioning an RFID network is as shown in FIG. 1 with the aid of a reader service terminal 4 (RS terminal). The RS terminal 4 is an appliance to assist the setting-up process (installation), which preferably makes contact without the use of wires via the RS signal 9 with each read/write station 1, 2, 3, 11, and can set its operating mode and operating parameters. At the start of the setting-up process, each read/write station 1, 2, 3, 11 is switched to an installation mode by the RS terminal 4. In this mode, each read/write station in the future RFID network carries out a neighborhood search according to the invention. In this case, by randomly briefly transmitting the RS signal 9 on the physical air interface and by continuous reception in the rest of the time on one or more frequencies, each read/write station 1, 2, 3, 11 determines the reception signal strength and identification of all the other potentially interfering read/write stations 1, 2, 3, 11, and stores this data in a neighborhood table. After a specific observation time, the determined tables are collected via the backbone network 5 or once again alternatively via the RS terminal 5. The RFID network structure (topology, addresses, . . . ) and operational tables or schedule (frequency channels, time slots, . . . ) are calculated from this data for each read/write stations 1, 2, 3, 11, using the off-line method. The server 10, the master 1 or alternatively the RS terminal 4 receive the network topology to be installed entered from the calculation, such that it can be distributed to the read/write stations 1, 2, 3, 11, in the case of the RS terminal 4 or of the master 1 via the RS signal 9. Each read/write station 1, 2, 3, 11 now receives via the backbone network 5 or from the RS terminal 4 the data required for its operation, relating to time slots, frequency channels and the frequency hopping sequence, from the table sent from the RS terminal 4 or the master 1.

Figure 3A:
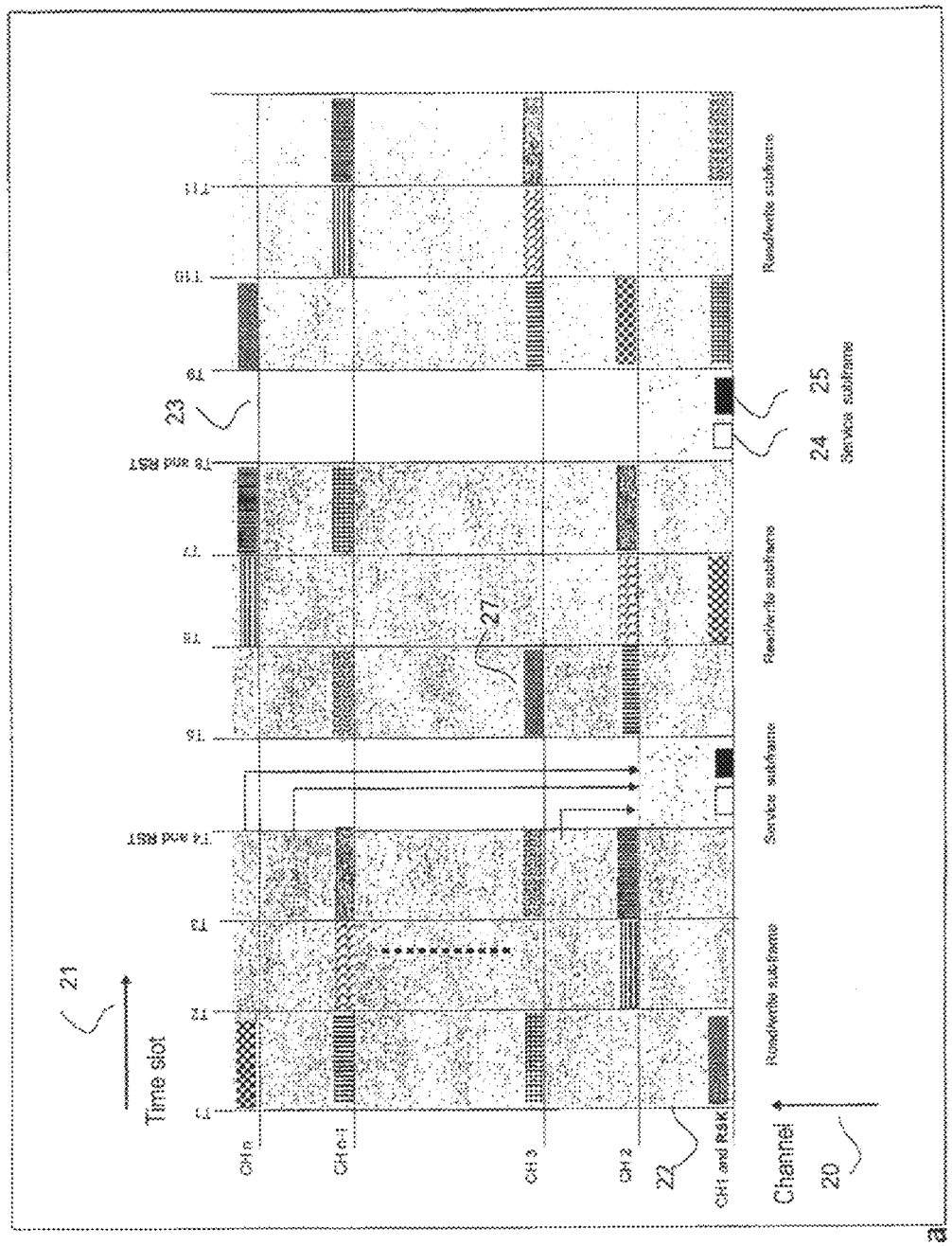
FIG. 3a shows a coordination plan based on the method according to the invention.

During network operation of the RFID network, the individual read/write stations operate on the following principles. Each read/write station uses exclusively only the frequency channels allocated to it relating to the time slots allocated to it. The stations are synchronized and are informed about the schedule periodically on a pronounced read/write station, the master 1, in an area whose frequency and time are defined, defined by a reader service channel RSK and a reader service time RST as shown in FIGS. 3a, b. The read/write stations 2, 3, 11 and the master 1 also have the capability in the synchronization interval to interchange data in order to match the network operation to the current situation.

Thus, from the original problem of excessive range of read/write stations in an RFID network, this now results in the advantage of organized operation based on a schedule, which is utilized as follows according to the invention:

1. Those read/write stations which hear one another over a large area can identify one another and communicate with one another, if necessary. This defines the network structure.

2. Those read/write stations which hear one another over a large area are intended to be operated in the read/write mode in terms of frequency and time such that they do not interfere with one another. This defines the schedules of the network subscribers.

B. Reader Service Channel (RSK) and the Reader Service Time (RST)

The two resources according to the invention, the reader service channel RSK and the reader service time RST, control the operation of the RFID network and have the RS signal 9, 105 on the physical air interface as the control means. The RS signal 9, 105 contains, as basic elements, time information relating to the synchronization of the network, and identification of the transmitting read/write stations, as well as details relating to their parent-child relationship. There is no absolute need for a backbone network (WLAN, bus).

Each read/write station has received the frequency channel or channels allocated to it, a time slot or a plurality of time slots or frequency hopping sequences, and the precise system time in the configuration mode, via the RS signal 9. The read/write stations carry out their read/write jobs appropriately. In the meantime, they change the frequencies at a well-defined time, the reader service time RST, to the reader service channel RSK or interrupt at least their read/write process. The read/write stations thus have the capability to interchange information via parents and to synchronize the internal clock time (bit clock) exactly, for example for synchronous frequency hopping or cooperative operating modes between a plurality of read/write stations. The specifically identified read/write station, referred to as the master 100, comprising the same hardware but with functionally different software, carries out the transmission of the time mark and the interchange of information.

Typical times for one implemented example are 1 second for a read time slot, 100 ms for an RST time slot and <10 ms for a frequency hopping change.

In some RFID bands and countries, the regulations stipulate that frequency hopping is obligatory when using the full transmission power. However, in some cases, it is simpler for the system not to operate the RSK using frequency hopping. The radio regulations generally allow operation on a fixed frequency channel at a low power level. In this case, the reading/writing of electronic tags for the master is simply dispensed with, and it is used just as a network control unit. The reduced power is still well sufficient to ensure data transmission between the read/write stations using the RS signal.

There are a large number of possible arrangements of RSK and RST which are more or less efficient depending on the network topology. Three fundamental preferred exemplary embodiments will be used to illustrate the principle and to indicate the approaches according to the invention.

1. "Low Data Exchange/Small Network Size" Model

Figure 3B:
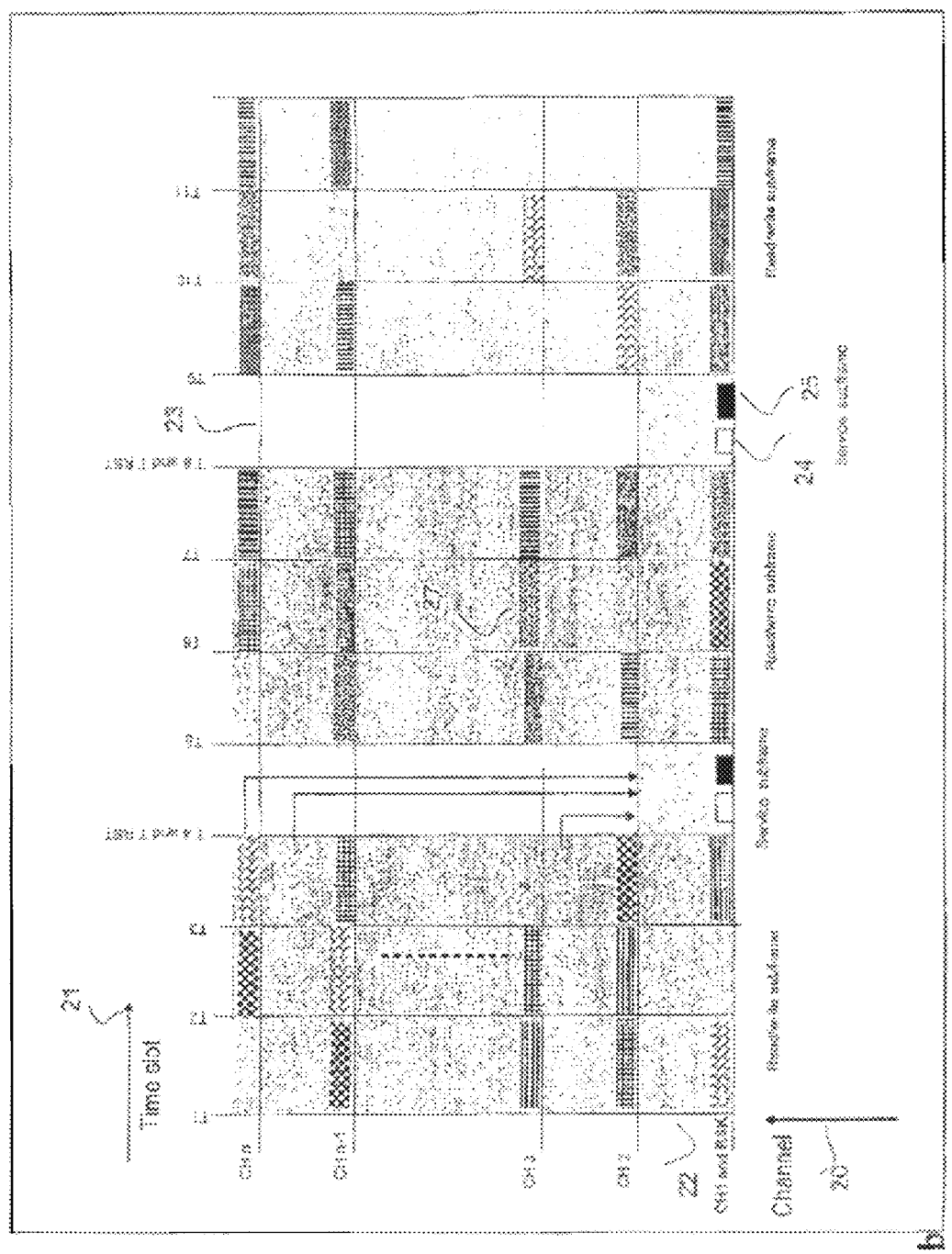
FIG. 3b shows a further coordination plan based on the method according to the invention, for an RFID network in the form of a star, with frequency hopping.

FIG. 3a shows one preferred variant with a simple network in the form of a star (FIG. 2 right-hand upper part without N4 branch) with n frequency channels 20 and m time slots (slots) 21, where n, m=1, 2, 3, . . . , after which a time slot 23 for the RFID network control is inserted, the RST. The communication using the reader service signal takes place in the frequency channel RSK 22. By way of example, two variants have been chosen from the wide range of options for selection of the time to remain on a frequency channel, the read/write duration of a cohesive process and the interval between the visits of the RSK and the times RST. Any other combination of time slots, read/write duration and RSK visit frequency are also included, in the same sense. Integer time ratios simplify the process. The RST visit duration in time slot 23 in the RSK 22 should, however, be kept as short as possible in order to operate the network efficiently (for example 100 ms). FIG. 3a has been based on the assumption that the frequency hopping interval is of the same duration as a read/write interval (for example 2000 ms) but is less than an RST visit interval (for example 800 ms). In contrast, FIG. 3b has been based on the assumption that the frequency hopping interval is shorter (for example 400 ms) than a read/write interval (for example 1.2 s), and that the read/write interval actually corresponds to the time between the RSK visits.

Very slow frequency hopping can be carried out, however, in the network as well, which, by way of example, envisages a synchronous channel change after three slots, actually in conjunction with the visit of the RSK for all read/write stations (not illustrated in a figure). Furthermore, individual time slots after an RSK/RST update can also perfectly well be used in a sequence which has been reorganized by the master, where this is worthwhile (see for example reservation section of a read/write window). The communication required for this purpose takes place, in addition to the synchronization that has been mentioned, in the so-called service subframes 24 and 25 with the aid of a suitable, known request/answer method between a parent and child.

The RSK was fixed on one channel (in this case the channel 1/RSK 22) for all the read/write stations in order to cover all the read/write stations periodically once again in a simple manner. Except for the time slot RST 23, the channel CH1/RSK 22 is also available for read/write cycles.

The RSK 22 for the time RST 23 always belongs to the master 100 for control purposes. The master can itself also carry out read/write processes. The rapid frequency changing times of modern read/write stations using SDR technology allow a rapid change to the RSK. The service frequency/time slot RSK 22/RST 23 can itself also invariably carry out frequency hopping in which case, the read/write stations must then also know this sequence, or their hopping sequences relative to the RSK hopping sequence must be stored in their procedure tables. Alternately, the master can notify the next RSK in the same way as the next RST as well in the instantaneous data interchange with the read/write stations via the RS signal (adaptive response).

Relatively large, relatively complex RFID networks may contain one master 100 and a plurality of assistants 103. These could share the time slots RST 23 on the channel CH1/RSK 22, or could use them alternately. This also allows problem-free interchange between assistants 103 and their children. Together with this, a plurality of further channels CHx/RSK in the time slot RST 23 can also advantageously be used as a division for control of the master and its children, as well as the assistant 103 and its children. The corresponding slots (for example CH3 for the time T4/RST) in FIG. 3a are in fact still free. In addition, however, a further time slot RST must be granted to the assistant 103 in order that it can likewise carry out an exchange with its parent, the master 100, or successive RSTs are used alternately. This duality between RSK and RST virtually always offers a possible further solution to the problem.

Another disadvantage of frequency hopping the RSK is the more complex management of the RSK for the other read/write stations, as well as the fact that unsynchronized read/write stations are more difficult to resynchronize. In FIGS. 3a, b, the same colors/shadings in each case denote the same read/write stations.

At least the synchronizations are readjusted in the RST time slots 23. This is done by evaluation of the bit flanks or timing of preambles, for example by transmission of a so-called m-sequence on the RS signal of the master 100 (or assistant 103) and the transmission of the coded clock time. Each receiving read/write station can locally produce the m-sequence, which is also known by it, and can determine and readjust the time difference with respect to the master by correlation. By way of example, this method is best known from GPS navigation. Furthermore, information can be transmitted relating to changes in network operation (white blocks 24 in the RSK 22 at the time RST 23). Furthermore, the read/write stations have the capability, black block 25, to themselves transmit messages to the master. This is done, for example, using a known carrier sense, collision avoidance method since, in general, no read/write stations, or only a small number of read/write stations, have anything to transmit. However, the RST could also easily be subdivided in a known manner into further time slots, which provide a TDMA access for each read/write station in order to transmit the typically small amount of data from and to the read/write stations.

The number of frequency channels is governed by the regulatory requirements for RFID radio systems. In the case of present-day crystal technology, the discrepancy in the timing of a read/write station after 10 seconds is less than 100 microseconds. At a data rate of 10 kBit/s on the RS signal, it is possible to accurately synchronize to about 10 microseconds, with an m-sequence with a length of, for example, 31 bits.

2. "Medium Data Exchange/Medium Network Size" Model

Figure 4:
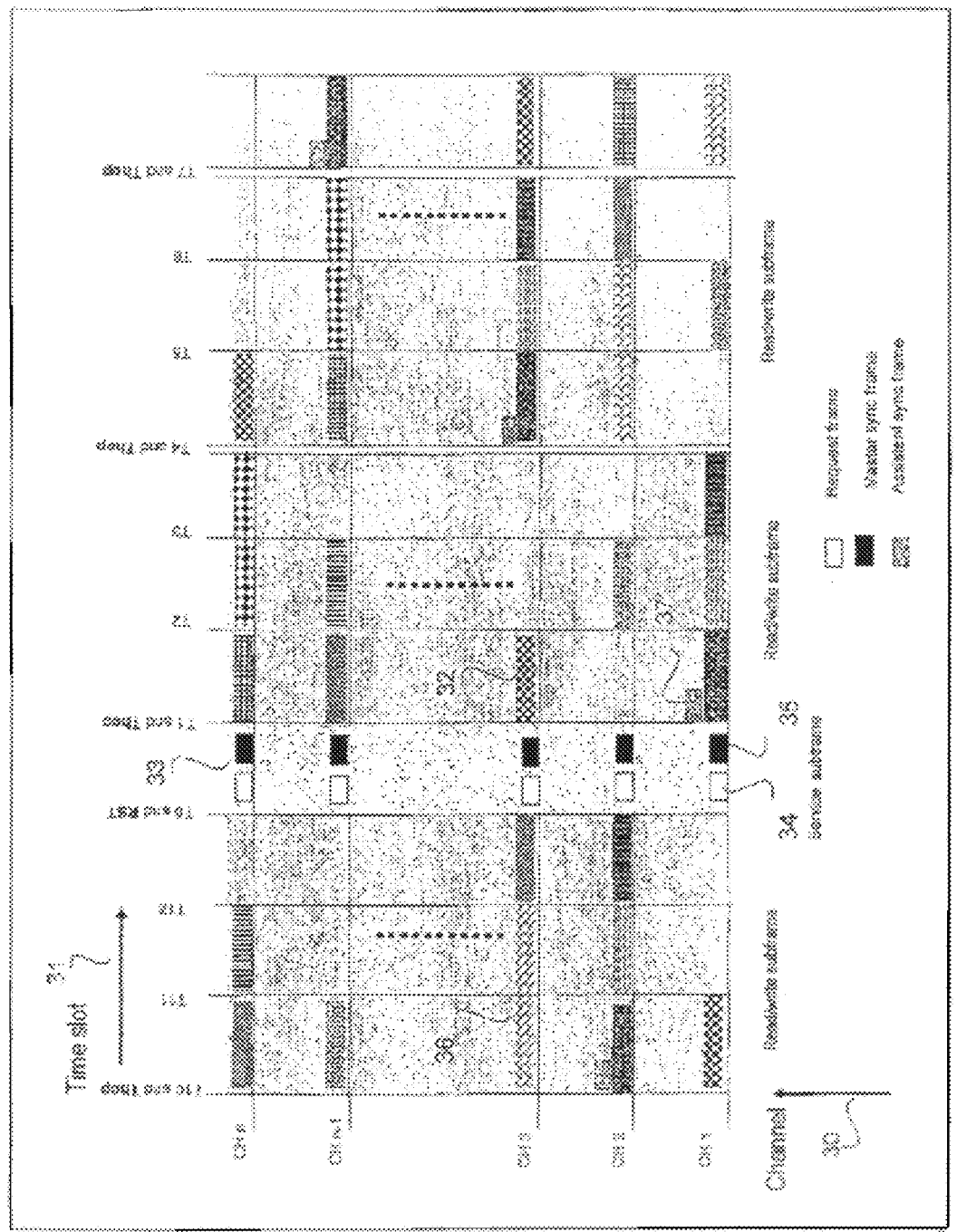
FIG. 4 shows a further coordination plan according to the invention for an RFID network, comprising a cluster with a master and an assistant, and FIG. 5 once again shows a coordination plan for the RFID network as shown in FIG. 2, with a frequency hopping mode.

FIG. 4 shows another solution, which dispenses with a fixed reader service channel RSK. All the frequency channels are used for the read process. The network topology comprises a cluster with a master 100 and an assistant 103 read/write station (FIG. 2). Once again, the read/write stations carry out frequency hopping or a more intelligent form of frequency agility. The read/write stations do not need to change frequency in order to interchange service data. A solution such as this has advantages in systems with read/write stations which have frequency synthesizers of only simple design and which cannot change frequency very quickly (for example in low-cost handheld stations). The interchange is achieved by the master 100 passing through all the channels sequentially in an RST time slot 33, and in each case transmitting the synchronization signal. The method has the advantage that only the master 100 and the assistant 103 must change frequencies quickly, and the method is also particularly suitable when, in practice, only the synchronization and a small amount of change data need be transmitted. Another preferred variant of this type is advantageous when all the read/write stations are operating on fixed frequencies, instead of having to carry out frequency hopping. Yet another variant, when using a master of complex design, is to monitor all the frequency channels continuously, possibly even using a plurality of transceivers operating in parallel, and, from this, to dynamically allocate the channels to the read/write stations on the basis of the observed activities (frequency agile systems).

The two read/write stations in channel CH2 in the first slot T11 and T12 are children of the read/write station in the channel CH2/slot T10 and listen to the master 100 with a signal quality which is too poor to ensure reliable synchronization. Since the cluster branch is very small, the assistant 103 transmits the synchronization data in the channel CH2/slot T10 during its read process on the RS signal. The group also always remains together in the respective same channel after a frequency hop (example in FIG. 4: CH1 from T1 to T3 and CH3 from T4 to T6) and can therefore be controlled easily.

All the statements described in the first model relating to the activity during the RST 33 can likewise be used in the same sense in this model.

3. "High Data Exchange/Big Network Size" Model

Figure 5:
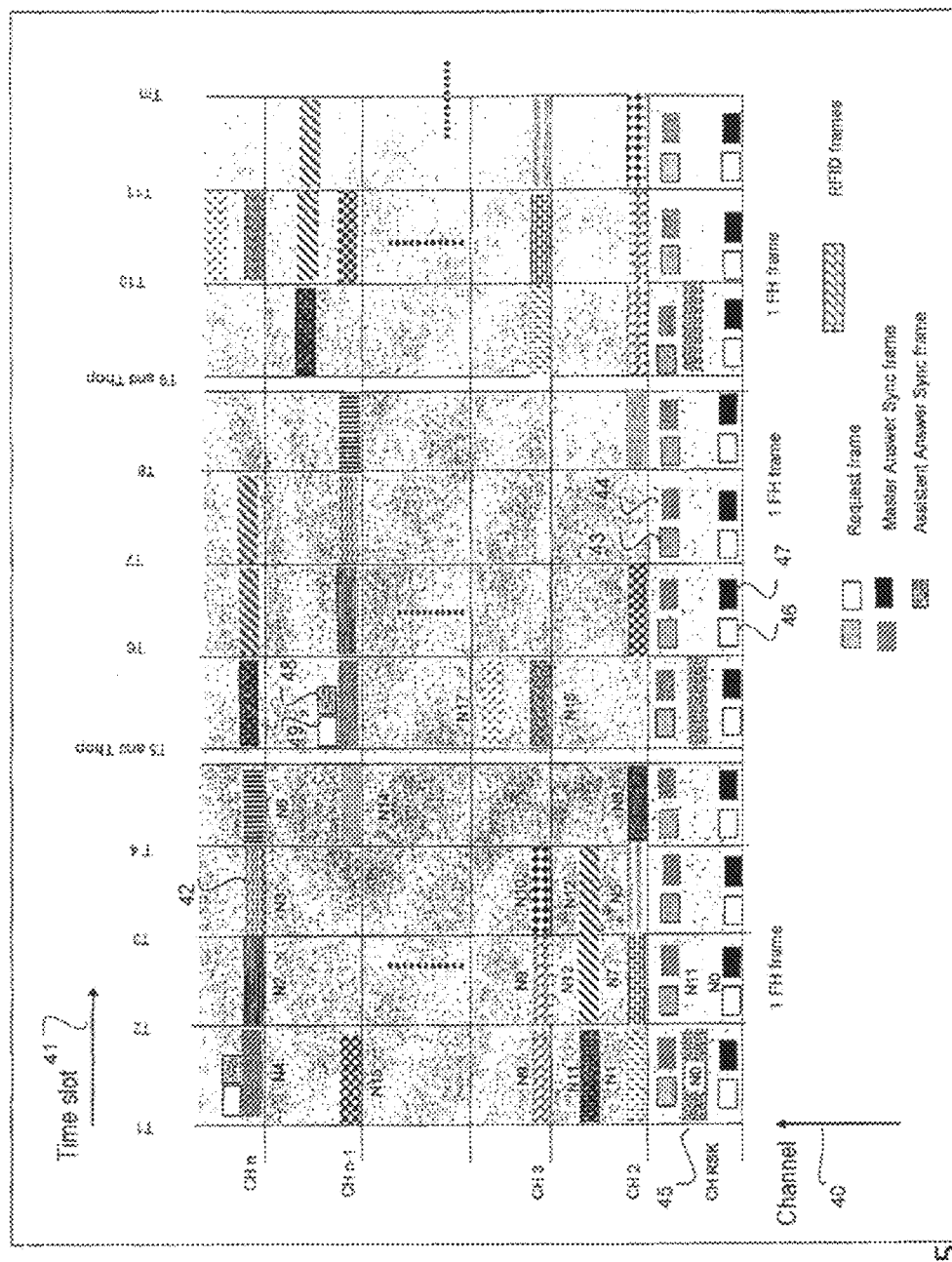

FIG. 5 shows the third fundamental type, which dispenses with an RST time slot and for this purpose operates with a continuously available RSK frequency channel 45. In order to assist understanding, the example has been chosen to be close to the two other splits, once again with frequency hopping.

The network topology on which this is based corresponds to that from FIG. 2, that is to say with 18 read/write stations N0 to N17. One example will be explained: the read/write station N3 is active in the time slot 42 at the time T3 on the frequency 40 in the channel CHn, and in the following interval at T7 on CHn−1.

In fact, however, the RST is not actually dispensed with and instead each read/write station searches for the RSK 45 immediately after its read/write operation there, during the next interval in which it did not intend to operate, it will in any case find a time slot in order to communication with the master. Its RST is therefore in each case provided individually immediately after its read/write interval. The master 100 therefore repeats the synchronization and information controlled by it in each time slot on the RSK 45, from the start. The master 100 itself is therefore more heavily involved with its children in this model.

The master N0 100 therefore itself expediently has few read/write tasks and can carry these out in in each case one of the time slots on the RSK 45 at the same time. It advantageously does not change channel in order to be available to all the children continuously in the predetermined time slot. Otherwise, the children would once again have to be provided by their master with a schedule for use of the frequency channels, as is necessary when frequency hopping is required.

The independent, small network branch with its master 102 can use the same frequencies as the large network part with the master 100, since the two networks do not interfere with one another. The same RSK channel 1 can also be used. Once again, the assistant N4, 103 synchronizes and controls its small number of children N2, N3, N6 directly, during its read/write process. In the case of relatively large assistant subnetworks, a further RSK 45 could be used, or finer time subdivision of the time slots within the RSK 45 using the TDMA method. All of the read/write stations each return to the RSK 45, in order to carry out synchronization and to interchange data, for one time slot after their read/write process (or after a plurality of such intervals, depending on the stability of the timebase). Furthermore, information relating to changes in network operation can once again be transmitted (white blocks 46 in the RSK 45). The read/write stations also have the capability, black block 47, to transmit messages themselves to the master 100. During its read operation, the assistant 103 communicates in the same sense with its small number of children N2, N3, N4 in the blocks 48, 49. The master 102 analogously has data interchange blocks 43, 44 such as these.

In practice, mixed forms of these three basic models can also be used, depending on the RFID network size and topology. According to the invention, it is in all cases advantageous to achieve data interchange and synchronization without external devices or backbone networks, with a minimal loss of resources of frequency channels and operational time slots.

All the statements described in the first model relating to the activity during the RST can likewise be used in the same sense in this model.

C. Reservation of a Read/Write Window

If a read/write station has to have a frequency channel and/or time slot (stated pair) available immediately (that is to say with high priority), then it can signal this in the next RST to its parent, with the aid of the RS signal, directly on the physical air interface. The parent (master 100 or assistant 103) in this case converts the schedules of other read/write stations in order to create a free pair, and grants the child approval via the RS signal, while at the same time it blocks another child in the said pair, which would otherwise have used this pair as intended. Each parent can manage only the pairs of its children. The time slots are preferably numbered relatively, in such a way that a pair can be described by an address with two integer numbers, and the positions of a read/write slot can easily be calculated in each read/write station.

In the exemplary embodiment in FIGS. 3 and 4, this reservation process is in each case carried out in the respective time slots RST 23 and 33 by communication in the respective blocks 24, 25 and 34, 35. In the example in FIG. 5, this is done on the channel RSK 45 during any of the time slots in the blocks 46, 47, but with a specific waiting time before implementation, specifically until it has been reliably possible to release one time slot. Collisions are not advantageous for any read/write station, and the fastest approach remains that of negotiated reservation.

D. Cooperative Read/Write Station Operations

In many conventional RFID applications, a plurality of read/write stations, a cooperative group 101, are used to read tag piles. This allows more tags (tags) to be read with greater reliability in the same time, for example in the case of goods pallets. For this purpose, at least one read/write station is defined as supplier of power and RF carrier signal, which supplies the tags, while all the other read/write stations involved at the same time attempt to receive as much information as possible from the tags. The data that has been read is then collated and is fused in the system middleware. In order to ensure that the timing of the other read/write stations precisely matches the timing of the transmitting read/write station, particularly good synchronization is helpful. This can easily be achieved with the aid of the RS signal directly on the physical air interface, once the read/write stations have previously been combined to form a cooperative group 101. An operating mode such as this can actually be provided permanently during installation, or temporarily by configuration messages from the master 100 (or assistant 103), likewise with the aid of the RS signal, directly on the physical air interface in the RST slot, or on the RSK frequency.

E. Externally Synchronized Read/Write Process

In some RFID applications, the read/write stations are requested to read tags (referred to as a trigger) by external processes such as light barriers or limit switches. Read/write stations such as these are inactive during the rest of the time. After a trigger event, however, a read/write station such as this should be active as quickly as possible in order not to miss the tags, which in some cases are moving. These trigger times normally do not coincide with the time slots in the network schedule. Provided that the number of read/write stations in a network is not excessive, the triggered read/write station can wait for its next time window (for example 2 seconds). In the case of a faster reaction time or if there are a large number of read/write stations, an alarm message is generated in the read/write station by the trigger signal, and is sent on the RS signal. The other RFID network subscribers on the same frequency can then miss their next planned time slot for the read process, therefore preventing interference with the reserved time slot. When frequency hopping is being used, this works only when the read/write stations are using the same frequency channel and the same frequency hopping sequence at that time. This can thus be provided without any disadvantage in the schedule.

In one preferred situation, as shown in FIG. 5, an immediate reservation can also be made sufficiently quickly with the master 100 via the RSK 45. The master 100 then controls access for the next slot, and returns a free slot/frequency pair, which is already predictable, to the triggered read/write station.

In another embodiment, specific frequency channels and/or frequency channel/time slot sequences can also be reserved for triggered read/write stations, which enjoy priority there. These read/write stations then preferably form their own sub-network, possibly with a dedicated assistant. The schedule relating to the time slots is then managed dynamically in accordance with predetermined priorities and the "first-come, first-served" principle. It should be noted that there is no other way to obtain faster access when all the resources are being utilized, except to wait. Collisions between two read/write station read/write cycles do not result in any advantages.

F. Temporary Mobile Read/Write Station Insertion

A read/write station must additionally be included in the network in one application, or if mobile read/write stations (for example forklift trucks) are moving in the network, then it is necessary to ensure that the interference situation does not deteriorate. According to the invention, this is preferably done by registration of the read/write station with the aid of the RS signal. Since the read/write station may be located at different points of use in the network, it must be synchronized with the network by listening and in the process must be informed about the parameters of the RSK and RST. It will then send its registration to the master 100 or assistant 103. The latter then generates a frequency/time slot pair, which is sent back to the mobile read/write station. The mobile read/write station can then operate in this area.

In another preferred method, the mobile read/write station observes the neighborhood for a certain time and creates a table with signal strengths and addresses. On the basis of the table, the mobile read/write station, or even more preferably a read/write station which has been newly introduced into the network, selects a master 100 or assistant 103, and receives a set of configuration data (frequency/time slot pairs etc.) for operation therefrom. If an assistant has been selected and this assistant has no more free pairs, then it itself starts a request to the master in order to obtain an additional pair.

G. Frequency Hopping and Frequency Agile Systems

In the case of frequency hopping or frequency-agile RFID networks, a situation arises in which the parent and children may no longer necessarily be operating on the same frequency over a relatively long time, particularly when the number of stations is greater than the product of the number of frequency channels and the number of time slots. If no countermeasures were taken, the system would therefore lose its structure in the event of movement, and/or it would have a new network topology for each hop. However, a good solution could also be found in this case with the aid of the RS signal and the method of the reader service channel RSK and the reader service time RST.

In principle, each read/write station could know the hopping sequences of its parent and could thus briefly change the radio channel at the correct time to the correct frequency, for service purposes. However, it is simpler and more reliable for all of the read/write stations to change periodically to the RSK 22 or 45 in the proposed method according to model 1 or 3, which does not change its frequency and is operated by the master 100. This can be done in the model 1 in the next RST 23 or in the model 3 directly after the respective active read/write interval on the frequency channel 45. In the case of this RSK visit, messages can be deposited with other read/write stations or can be received from other read/write stations. The master (or assistant) in this case forms a type of relay station between the changing channels using the blocks 24, 25 and 46, 47, the number of which per time slot can also easily be extended to more than two.

Read/write stations which for any reason leave synchronization always return to synchronous operation again in the solution with RSK and RST slots simply by switching to the RSK, resynchronizing themselves by listening, registering, and if necessary adapting their data set. Since the time to remain on each frequency is governed by the regulations (for example 400 ms in the case of frequency hopping, 4 s in the case of adaptive hopping), only some read/write stations can share the same channel in each hopping interval (T1 to T4 in FIG. 5), preferably at least read/write stations which have to collaborate in cooperative groups 101 every now and then. In contrast to FIGS. 3a, b to 5, situations can occur in which the read time lasts for longer than the time to remain on one frequency. Such frequency hops during the read process are not intrinsically disturbing provided that they are carried out bit-synchronously with respect to the tag data stream, since the hops are cancelled out in the receiver by using the same RF carrier signal for down-mixing as that used in the transmitter for up-mixing. The frequency hopping rate therefore does not change the principle of the method, although it should actually advantageously be an integer multiple or divisor of the time slot duration.

Frequency-agile systems carry out a frequency change only when there is an external reason, such as channel interference. The change can be carried out autonomously by a read/write station only when sufficient channels are available and the read/write station has been programmed with a diversion channel for the configuration. If sufficient spare channels or time slots to carry out this procedure are not available, then the agility is controlled by the master or assistant on the basis of a message from one of the children. In this case, the entire network may have an agile behavior, comparable to a manual frequency hop. Alternatively, individual nodes can be supplied with new frequency/time slot data during the course of an RSK/RST visit, corresponding to 23 in FIG. 3a, 33 in FIG. 4, and 45 in FIG. 5. In any case, the intelligence for agility remains with the master 100, or if need be with the assistant.

A master can also cause individual read/write stations to carry out a new neighborhood search and to supply their data relating to this for agile planning in the next RSK/RST time slot with the aid of the RS signal.

H. Interference Situations

If a read/write station finds that the frequency channel allocated to it is frequently subject to interference at the allocated time, and that this interference is caused by another read/write station (identified on the basis of the transmitted address on the RS signal), then either the timing of one of those involved has shifted or the arrangement, for example of the antennas, or the propagation situation (radio signal paths) has been changed by other read/write stations. In this situation, the read/write station changes to the RSK and resynchronizes itself by waiting for the next signal from the parent in the RSK/RST, corresponding to 23 in FIG. 3, 33 in FIG. 4 and 45 in FIG. 5. If an interference problem exists which is not caused by loss of synchronization, then, after carrying out synchronization in the RSK/RST, it reports the problem and requests a new time/frequency slot pair. The interference is recorded in the master as a log file with time details, resulting in a long-term analysis for system service. Interference sources which do not result from RFID read/write stations can thus likewise be identified and avoided.

The invention claimed is:

1. A method for commissioning an RFID network, comprising a number of read/write stations, in which a reader service signal is modulated on a read/write signal which is required for processing a number of electronic tags characterized in that the following steps are carried out:

each read/write station transmits at least one test signal, comprising its own station address, on at least one frequency channel, with the test signal being contained as a first sequence in the reader service signal;

each read/write station receives, on the available frequency channels, the receivable test signals of adjacent read/write stations and stores a number of parameters of these received test signals in a neighborhood table, comprising a station address, a frequency channel number and a measured signal strength of each receivable, adjacent read/write station;

each neighborhood table is received at least by a collecting station, server, read/write station;

the at least one collecting station calculates a network structure with structure data and calculates a coordination plan with coordination data using a number of time slots and a number of frequency channels, with a service frequency channel or a service time slot being defined, which are used for servicing purposes by the read/write stations, the at least one collecting station sends to the read/write stations at least appropriate structure data and coordination data for organized, synchronous network operation, so that the read/write stations do not have a disturbing influence on one another.

2. The method as claimed in claim 1, characterized in that a read/write station is entrusted with the task of a master, which is referred to as a parent, which maintains at least one defined radio link with all the read/write stations which are connected to it in the form of a star, and are referred to as children.

3. The method as claimed in claim 2, characterized in that the children receive a second sequence on the reader service signal from the parent for synchronization purposes, with the children changing to the service frequency channel for the duration of the service time slot.

4. The method as claimed in claim 2, characterized in that the children receive a second sequence on the reader service signal from the parent for synchronization purposes, with the children remaining on their operating frequency channel during the service time slot, and with the parent sending all the available frequency channels with the second sequence.

5. The method as claimed in claim 2, characterized in that the children receive a second sequence on the reader service signal from the parent for synchronization purposes, with the children changing from an operating frequency channel to the service frequency channel directly after a read/write process.

6. The method as claimed in claim 2, characterized in that a read/write station which is acting as a child of the master is entrusted with a task of an assistant which receives further children which cannot maintain an adequate radio link with the master, with the assistant providing these read/write stations, which cannot be accessed by the master with structure data and coordination data from the master as appropriate.

7. The method as claimed in claim 6, characterized in that in addition to sending the sequence from the master or assistant to the child, the latter sends a message to its master or assistant, and the master or assistant transmits a response message in order to adapt the structure data and/or the coordination data.

8. The method as claimed in claim 1, characterized in that the collecting station is a reader service terminal which at least temporarily carries out the commissioning of the RFID network.

9. The method as claimed in claim 1, characterized in that the collecting station is a selected read/write station which at least temporarily carries out the commissioning of the RFID network.

10. The method as claimed in claim 1, wherein both the service frequency channel and the service time slot are defined.

11. A system for commissioning an RFID network, comprising a number of read/write stations, in which a reader service signal is modulated on a read/write signal which is required for processing a number of electronic tags characterized, the system comprising:

means for transmitting from each read/write station at least one test signal, comprising its own station address, on at least one frequency channel, with the test signal being contained as a first sequence in the reader service signal;

means for receiving at each read/write station, on available frequency channels, the receivable test signals of adjacent read/write stations and means for storing at each read/write station a number of parameters of these received test signals in a neighborhood table, comprising a station address, a frequency channel number and a measured signal strength of each receivable, adjacent read/write station;

means for receiving at least by a collecting station, server, read/write station each neighborhood table;

the at least one collecting station calculating a network structure with structure data and calculates a coordination plan with coordination data using a number of time slots and a number of frequency channels, with a service frequency channel or a service time slot being defined, which are used for servicing purposes by the read/write stations, the at least one collecting station sending to the read/write stations at least appropriate structure data and coordination data for organized, synchronous network operation, so that the read/write stations do not have a disturbing influence on one another.

12. The system as claimed in claim 11, characterized in that a read/write station is entrusted with the task of a master, which is referred to as a parent, which maintains at least one defined radio link with all the read/write stations which are connected to it in the form of a star, and are referred to as children.

13. The system as claimed in claim 12, characterized in that the children receive a second sequence on the reader service signal from the parent for synchronization purposes, with the children changing to the service frequency channel for the duration of the service time slot.

14. The system as claimed in claim 12, characterized in that the children receive a second sequence on the reader service signal from the parent for synchronization purposes, with the children remaining on their operating frequency channel during the service time slot, and with the parent sending all the available frequency channels with the second sequence.

15. The system as claimed in claim 12, characterized in that the children receive a second sequence on the reader service signal from the parent for synchronization purposes, with the children changing from an operating frequency channel to the service frequency channel directly after a read/write process.

16. The system as claimed in claim 12, characterized in that a read/write station which is acting as a child of the master is entrusted with a task of an assistant which receives further children which cannot maintain an adequate radio link with the master, with the assistant providing these read/write stations, which cannot be accessed by the master with structure data and coordination data from the master as appropriate.

17. The system as claimed in claim 16, characterized in that in addition to sending the sequence from the master or assistant to the child, the latter sends a message to its master or assistant, and the master or assistant transmits a response message in order to adapt the structure data and/or the coordination data.

18. The system as claimed in claim 11, characterized in that the collecting station is a reader service terminal which at least temporarily carries out the commissioning of the RFID network.

19. The system as claimed in claim 11, characterized in that the collecting station is a selected read/write station which at least temporarily carries out the commissioning of the RFID network.

20. The system as claimed in claim 11, wherein both the service frequency channel and the service time slot are defined.

* * * * *